US006968340B1

(12) United States Patent
Knowles

(10) Patent No.: US 6,968,340 B1
(45) Date of Patent: Nov. 22, 2005

(54) TECHNIQUE FOR NAVIGATING COMPONENTS OF A MODEL HAVING COMPLEX RELATIONSHIPS

(75) Inventor: Nicholas Jolyan Staniforth Knowles, London (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/105,528

(22) Filed: Jun. 26, 1998

(51) Int. Cl.[7] ............................................. G06F 17/00
(52) U.S. Cl. ..................... 707/102; 707/104.1; 715/771
(58) Field of Search ...................... 707/3, 4, 10, 104.1, 707/100, 101, 102; 709/102, 200, 202, 203; 715/501.1, 764, 771

(56) References Cited

U.S. PATENT DOCUMENTS

| | | | | |
|---|---|---|---|---|
| 5,395,243 A | * | 3/1995 | Lubin et al. ................. | 434/118 |
| 5,412,884 A | * | 5/1995 | Staples et al. ................ | 37/342 |
| 5,481,666 A | * | 1/1996 | Nguyen et al. ............... | 345/357 |
| 5,533,183 A | * | 7/1996 | Henderson, Jr. et al. .... | 395/344 |
| 5,586,311 A | * | 12/1996 | Davies et al. .................. | 707/1 |
| 5,627,979 A | * | 5/1997 | Chang et al. ................ | 345/335 |
| 5,642,511 A | * | 6/1997 | Chow et al. .................. | 395/701 |
| 5,721,901 A | * | 2/1998 | Banning et al. ................ | 707/4 |
| 5,726,688 A | * | 3/1998 | Siefert et al. ................ | 345/352 |
| 5,819,086 A | * | 10/1998 | Kroenke ....................... | 707/102 |
| 5,875,446 A | * | 2/1999 | Brown et al. ................... | 707/3 |
| 5,903,478 A | * | 5/1999 | Fintel et al. ............ | 395/500.27 |
| 5,926,180 A | * | 7/1999 | Shimamura .................. | 345/357 |
| 6,018,344 A | * | 1/2000 | Harada et al. ............... | 345/357 |
| 6,038,566 A | * | 3/2000 | Tsai ............................ | 707/102 |

FOREIGN PATENT DOCUMENTS

WO 99/40505 * 8/1999 ............. G06F 3/00

OTHER PUBLICATIONS

Scheer et al "Extending data modeling to cover the whole enterprise", ACM 1992, pp. 166-171.*
Gedye et al "Browsing the chip design database", IEEE 1988, pp. 269-274.*

* cited by examiner

*Primary Examiner*—Uyen Le
(74) *Attorney, Agent, or Firm*—Gregory M. Doudnikoff; George Grosser

(57) ABSTRACT

A technique, system, and computer program for displaying and editing components of data which may have complex many-to-many (i.e. non-hierarchical) relationships, using a program such as a browser. The components are presented in such a way as to make the relationships explicitly visible, allowing a user to navigate the relationships in an efficient, intuitive manner that clearly aligns with the structure of the underlying object model. In a preferred embodiment, when the user selects one of the explicit relationships, he is presented with a list of actions tailored to that relationship. In a further enhancement, the user may define one or more filters that will be applied to the actions list before it is presented.

14 Claims, 11 Drawing Sheets

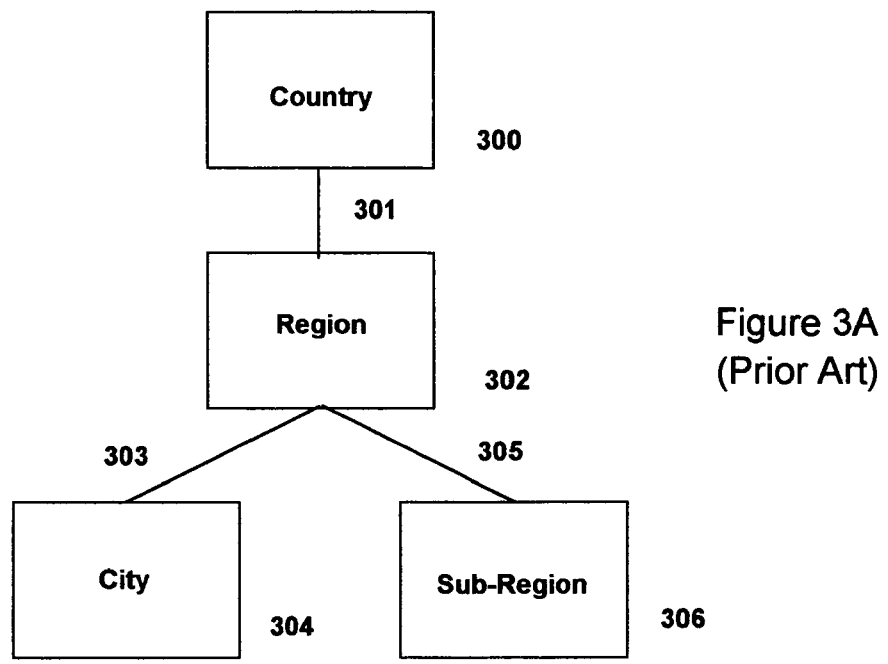
Figure 3A
(Prior Art)
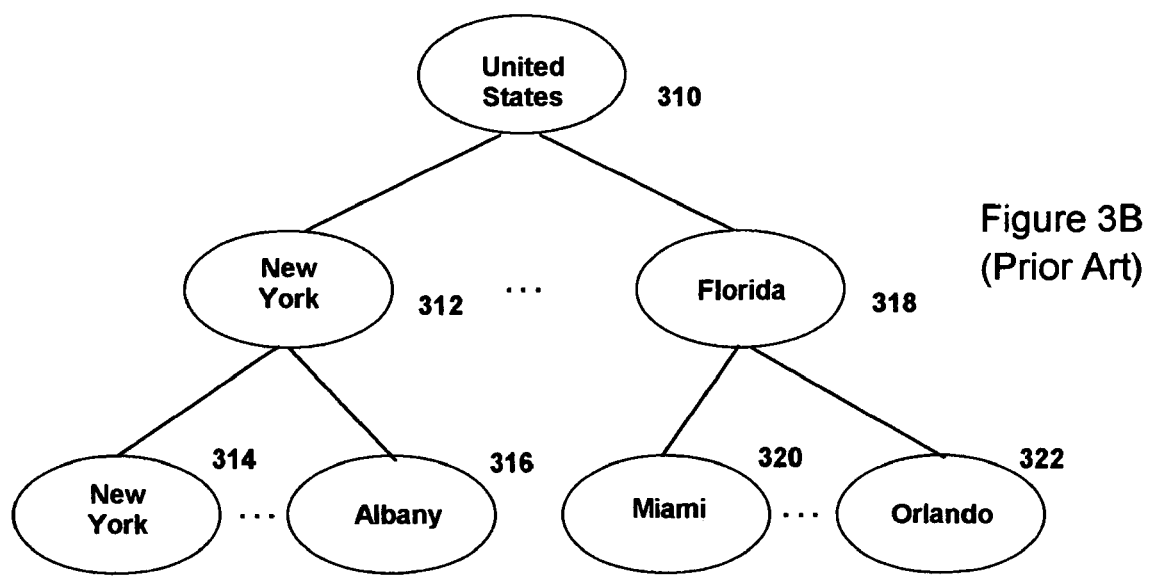
Figure 3B
(Prior Art)
Figure 3
(Prior Art)

| Project Number | Responsible Dept | Responsible Employee | Sub-Project |
|---|---|---|---|
| AD3100 | D01 | 00010 | MA2100 |
| MA2100 | D01 | 00050 | null |
| OP2000 | E01 | 00010 | OP2010 |
| OP2010 | E21 | 00320 | null |

Figure 4B
Project table

| Department Number | Manager Number | Department Name |
|---|---|---|
| D01 | 00010 | Development |
| E01 | 00010 | Administration |
| E21 | 00320 | Support |
| E31 | 00070 | Operations |

Figure 4C
Department table

| Employee Number | Employee Name | Department |
|---|---|---|
| 00010 | Jane Doe | D01 |
| 00050 | John Doe | D01 |
| 00100 | John Q Public | E01 |
| 00320 | Jane Q Public | E21 |

Figure 4D
Employee table

TECHNIQUE FOR NAVIGATING COMPONENTS OF A MODEL HAVING COMPLEX RELATIONSHIPS

BACKGROUND OF THE INVENTION

1. Field of the Invention

The present invention relates to software modelling, and deals more particularly with a method and apparatus for displaying components of a model which may have complex, semantically-typed relationships, using a program such as a browser. The components are presented in such a way as to make the relationships among them explicitly visible, allowing a user to navigate, edit, and populate the model in an efficient, intuitive manner by using these explicit relationships.

2. Description of the Related Art

Modern computer programs typically present information to people using those programs through a graphical user interface ("GUI"). In a GUI, information is depicted using graphical elements such as icons, menus, etc., as well as text. A user interacts with these graphical elements using the keyboard or some type of pointing or selecting device, such as a mouse or light pen.

A software application is, in essence, a model—that is, a computer-based representation of some real (or virtual) problem domain. In this computer-based representation, the salient aspects of the application domain are commonly represented as objects and relationships between the objects. Further, the software programs represent transforms on the object model. That is, the software program may manipulate the objects and/or relationships in an application-dependent way. This representation is referred to as an "object model". Object models are well known in the art. In many cases, this modelling is formalized by the explicit building of a model of the model, known as a "metamodel".

A metamodel defines the element types (both entity objects and relationship objects) that are available with which to build a model. The elements used to define a metamodel may themselves be defined using a "meta-metamodel". It is possible to choose a "reflective" set of element types, such that the same fundamental element types may be used to define both a metamodel and a meta-metamodel. A reflective metamodel makes it possible to use the same tool set to work on meta-metamodels, metamodels, and models—an instance at one level of abstraction being a type for the next level. For example, the relationship links in a model are instances of the relationship types of the metamodel, which are themselves instances of the relationship types of the meta-metamodel.

When a user is developing application programs, a common development approach is to use some type of interactive development environment ("IDE") that has a GUI. An IDE typically includes facilities for displaying and editing source code, compiling and debugging programs, etc. An example of an IDE with a GUI is VisualAge for Smalltalk, from the International Business Machines Corporation ("IBM"). (VisualAge is a registered trademark of IBM.) In the case of an IDE, part of the object model represents the software components themselves.

In an interactive development environment, information is commonly presented to the developer using a browser. A browser in this context is a type of window-based program adapted to viewing and editing information, and typically offers specific options to edit the model—that is, create, delete, or link instances of elements. A browser is typically divided into a number of different regions that are used for specific types of information. Commonly, the browser will have upper and lower horizontal regions, and the upper region will be further divided vertically. These vertical regions will be referred to herein as "panes". Due to the limited amount of space available on the display screen, and the need to display data elements that are sufficiently descriptive so as to be understandable to the user, the number of panes is typically limited to three or four.

When a browser is used in object-oriented development, such as when using the Smalltalk or Java programming languages, the leftmost pane of the upper region is conventionally used for displaying information at a highest level of the hierarchy in the object model. (Java is a trademark of Sun Microsystems, Inc.) The object model in an object-oriented programming environment typically has objects of types referred to as packages (or applications), classes, and methods. These objects are linked by relationships of several different types, notably containment, inheritance, reference, and dependency. For example, methods are contained within classes, which are contained within packages (or applications). Classes and methods may inherit from other classes and methods. Applications, classes, or methods may depend on other applications, classes, or methods. Classes and methods may reference other classes and methods. These concepts are well known to one of ordinary skill in the art. A developer working with an object model may wish to view related objects in a number of different ways, for different purposes, using different views over the same objects. A view is a display of related model elements from a given perspective, that satisfies a user's query. For example, for a given class, the developer may wish to view all methods contained within that class. Or, he may wish to view all classes and methods which inherit from that class. In existing browsers, this information is presented in a hierarchical format.

To view hierarchies in GUIs, browsers with a number of panes are typically used. Each logical connection between panes represents a relationship. For example, a relationship of some type exists between elements displayed in a first pane, and the elements displayed in a second pane. Once an element representing an object (or objects) from a highest level of the hierarchy has been displayed in the leftmost pane of the browser, the developer is able to select one of the displayed elements. In an object-oriented development environment, the information that is typically displayed in the leftmost pane is a list of classes from the highest level of the model; or, a list of categories may be displayed, where the highest-level classes have been grouped into categories for ease of reference. Once the user selects an element from the list presented, the next pane to the immediate right is updated. The elements of the list in this updated pane depend on what was displayed in the pane from which the user made his selection: if the user selected from a list of classes, then the updated pane contains the subclasses and/or methods of the selected class; if the user selected from a list of class categories, then the updated pane contains a list of the classes defined as being in that category. The user can then make a subsequent selection from the list in this pane. In response to this selection, another pane (again displayed to the immediate right) is updated. The elements of the list in this pane again depend on the user's selection, and the type of elements defined as being available through the relationship(s) of the view the browser provides. Thus, with each selection made by the user from a subsequent pane, he is forming a trail through the hierarchy, thereby navigating the underlying hierarchy of the object model. A user unfamiliar with the model will typically infer the structure of the underlying object model from the structure of the browsers and the available navigations they offer.

While this navigation technique and the browser that facilitates it are well adapted to a simple object model that has relatively few types of elements, many applications have models that are more complex, and which do not fit well into a representation based on a single hierarchy or a few simple hierarchies. Existing browsers typically represent a hard-wired, predetermined selection of particular relationships that constitute a view. This makes it difficult to add new views, because there may be no way to display those views in the browser. Further, a combinatorial explosion results from trying to enumerate the views that are possible over a given model with its multiple object types and multiple relationship types. This makes it impractical to build browsers for each view, or even to know which views would be useful to build. For models that are extensible by the user, a special browser is needed in order for the user to see the extensions he has made, and to perform useful editing operations on the model elements. Further, when an object model is complex, there may be many different useful ways of navigating the relationships, and this proliferation of navigation paths may make it difficult to understand the underlying metamodel of the model that is being navigated. Even a simple hierarchical nesting of elements within a pane—as is used by file managers such as Windows Explorer from Microsoft Corporation, for example—requires the user to already understand the available relationships (simple containment of files and directories within other directories, in the case of a file manager) as they are being navigated.

Accordingly, a need exists for a way to display these complex models, such that the user can conveniently and intuitively understand the relationships defined between one component and another. Further, a need exists for allowing the developer to navigate, edit, and populate these complex models using the relationships. The developer can then develop applications for the model, and/or data for applications based on the model. The proposed technique provides an explicit visual representation of the relationships for a selected component, where the relationships are represented as model elements. Filters may be defined for the available relationships, where a filter limits the browser view to a useful subset of the available relationships. The semantic typing of the relationships is used to provide the user with a meaningful and useful choice of actions to populate, edit, and navigate the model. Preferably, the present invention will be used to enhance the functionality and usability of a conventional hierarchically-oriented browser. Alternatively, a browser may be specifically designed to take advantage of the inventive concepts of the present invention.

SUMMARY OF THE INVENTION

An object of the present invention is to provide a technique enabling a user to conveniently and intuitively navigate, edit, and populate a model having complex relationships.

Another object of the present invention is to provide this technique by explicitly displaying the relationships between components as elements of the model.

Another object of the present invention is to provide this relationship information using an implementation that enhances a conventional hierarchically-oriented application browser.

A further object of the present invention is to provide a technique whereby the specific relationships defined for a component can be used to present a tailored choice of actions to the user.

Another object of the present invention is to provide a technique whereby relationship filters can be created, to limit the choice of available relationships to a useful subset.

Accordingly, the present invention provides a system, technique, and method for convenient and intuitive visually-oriented navigation of an object model, comprising: a subprocess for displaying a browser; a subprocess for retrieving and displaying a set of elements in the browser, where the elements represent the object model; a subprocess for enabling a user of the code to select one of the elements; and a subprocess for retrieving and displaying relationship information from the model when the selected element is a component of the model. Preferably, a subprocess is also provided for enabling the user to select one or more relationships from the relationship information. Optionally, a subprocess for presenting an action list to the user is included, and the action list may be tailored to the selected relationships or to a selected component. The action list may optionally be filtered before being presented to the user, using one or more predefined filters. Additionally, the browser may be a conventional browser.

Other objects and advantages of the present invention will be set forth in part in the description and in the drawings which follow and, in part, will be obvious from the description or may be learned by practice of the invention.

The present invention will now be described with reference to the following drawings, in which like reference numbers denote the same element throughout.

BRIEF DESCRIPTION OF THE DRAWINGS

FIGS. 3A–3C depict an example of a hierarchical object model, and using a conventional hierarchically-oriented browser to display its components;

FIGS. 4A–4F depict an example of a relational object model, and navigating the complex relationships of this model using a browser that implements the present invention.

DESCRIPTION OF THE PREFERRED EMBODIMENT

Figure 1:
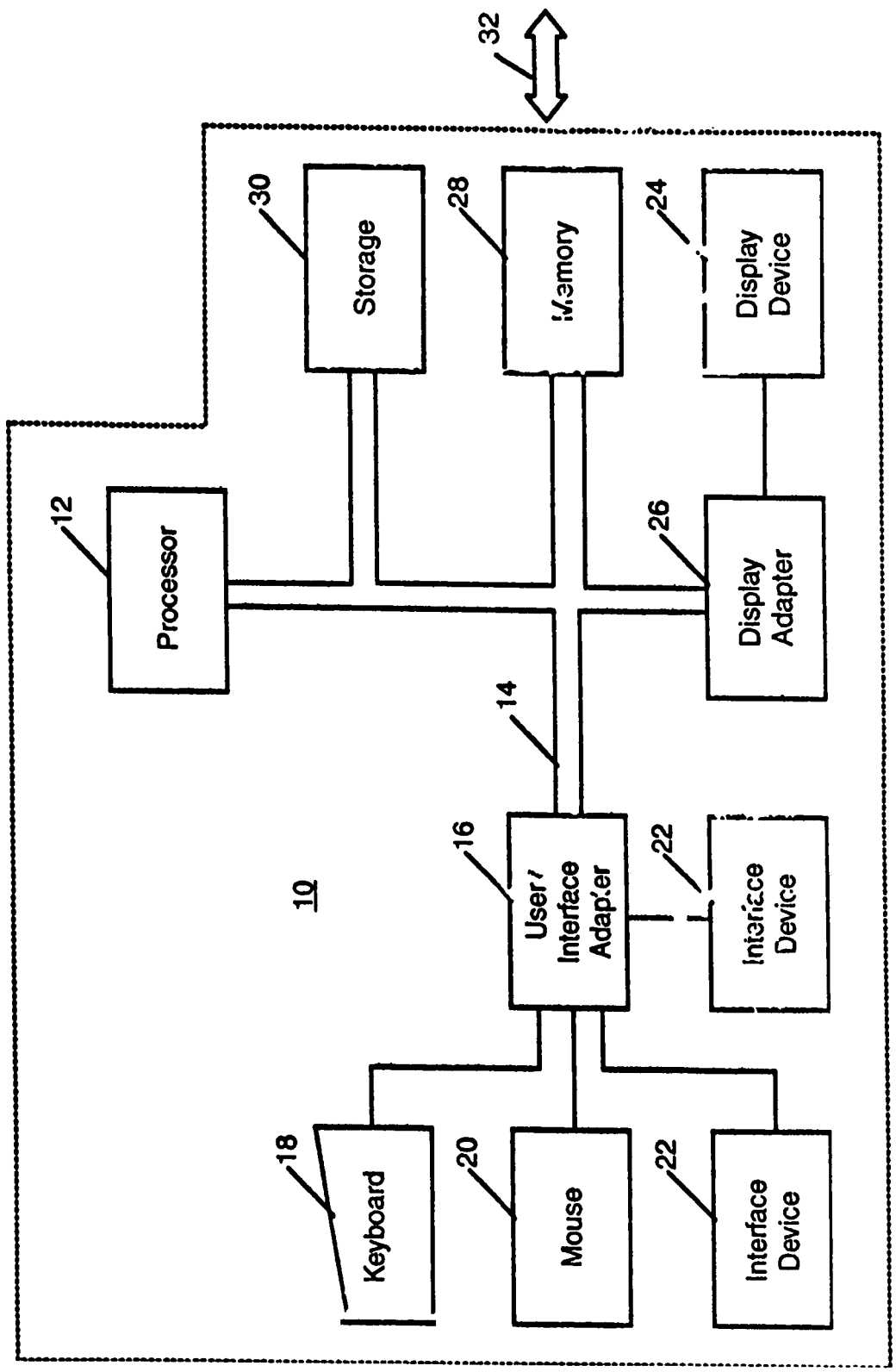
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22 (including a touch sensitive screen, digitized entry pad, etc.). The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), the workstation 10 can be a client in a client/server arrangement with another computer, it may be a standalone computer not connected in a network, etc. All of these configurations, as well as the appropriate communications hardware and software, are known in the art.

Figure 2:
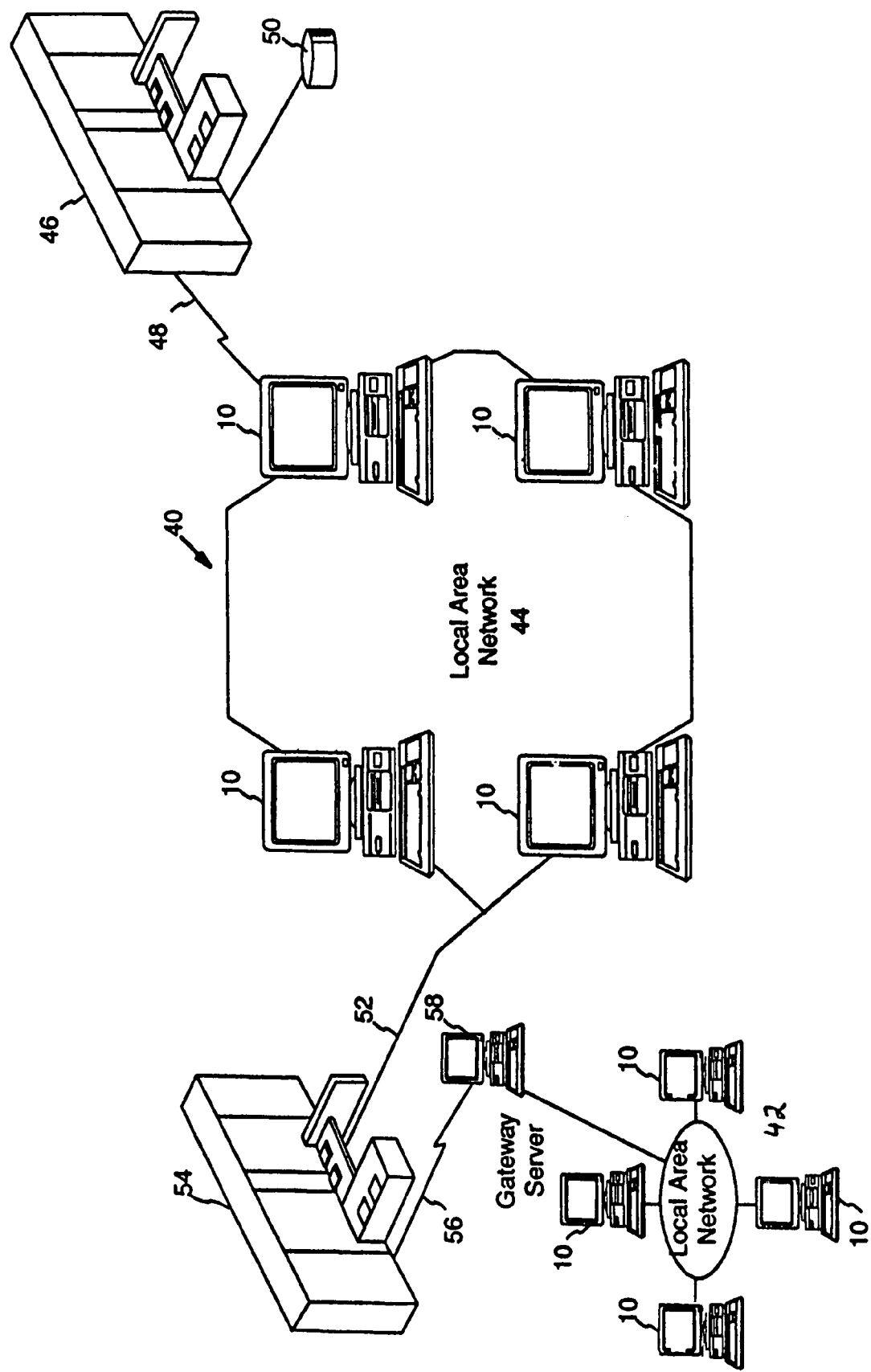
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The component and relationship displays resulting from use of the present invention may be displayed on any of the various display devices 24, and accessed using any type of interface device such as a keyboard 18, mouse 20, and/or other interface devices 22.

The preferred embodiment of the present invention will now be discussed with reference to FIGS. 3 through 5.

In the preferred embodiment, the present invention is implemented as a computer software program. The implementation of the invention may be used to view components and their relationships from an underlying model. While this invention is particularly useful with browsers used in object-oriented software development, it will also be useful for navigating any model with typed links—that is, where semantic types have been assigned to the links, or relationships, between objects. For example, this invention could be used to navigate and edit a diagram of anatomical parts of an animal, provided the semantic information about the relationships linking the anatomical parts is available.

According to the present invention, relationships are explicitly represented as elements of the model, as are the objects (components) in that model. This object model representation can then be used to create a user interface for applications that operate against a relational database. In other words, object models for which there are useful views that are not strictly hierarchical in structure can be conveniently and intuitively navigated, edited, and populated using the present invention—without requiring a specially-designed browser. A relational database is defined in terms of tables and relationships, as is known in the art. Relational databases typically have many complex relationships, which are not necessarily hierarchical in structure. That is, these relationships do not have simply the "one-to-many" structure that characterizes hierarchical models, but have "many-to-one" and "many-to-many" relationships as well (as is known in the art). Thus, existing hierarchically-oriented browsers cannot adequately display relationships from a relational model. The present invention provides a technique which maps object model relationships to these database relationships. By explicitly displaying the complex relationships of the relational model, the present invention enables a user to better comprehend the underlying model and to easily navigate among the components of that model, edit the model, or populate the model.

In the preferred embodiment, the underlying object model is a relational model. However, the inventive concepts of the present invention apply equally well to any models having typed links. The present invention may be implemented by integrating software code into an existing browser (that is, a browser adapted to hierarchical models), or it may be implemented as part of a browser developed specifically to take advantage of these inventive concepts in order to better support relational models. In either case, the resulting browser software may execute entirely on the user's computer (as part of a stand-alone software package), or it may execute partly on the user's computer and partly on a remote computer. In the latter scenario, the remote computer may be connected to the user's computer through a LAN or a WAN that is part of a network owned or managed internally to the user's company, or the connection may be made to an external computer (for example, through the Internet using an Internet Service Provider).

The present invention solves the previously-mentioned problems of displaying models that have complex relationships among components, and representing those relationships in a manner that allows the model to be conveniently and intuitively navigated, edited, and populated. When a user selects a component from a component list in a browser, according to the present invention, the relationships defined for that component are explicitly displayed as model elements. Preferably, the component list is displayed in a first pane of the browser, and the relationships are displayed in a second pane which is immediately adjacent to the first pane. However, other layouts are possible, without deviating from the inventive concepts of the present invention. For example, some structure other than a list may be used, or there may be a separate pane displayed prior to the component pane (such as a component category pane). The semantic typing of the links between objects is used to display the relationships to the user.

Once the relationships for the selected component are displayed, the user may choose one or more of those relationships in order to navigate, edit, or populate the underlying model. Each of the relationship types from the model can be used in this manner to provide a view on the model, showing the elements related to a given element. When an object and relationship have been chosen (and displayed), along with the corresponding related objects, a directed graph is formed. As is known in the art, a directed graph is the representation formed when connecting nodes from sets using edges, where the connected edges imply an ordered direction of graph traversal. As applied to the present invention, the nodes are objects from the model, and the edges are relationship links between the objects (i.e. instances of relationship types representing a connection between the nodes). The directed graph then indicates the path formed from traversing from one object, to other objects, using relationships between the objects. Notably, the direction of this path does not necessarily indicate any subordinate status among the objects, but simply the existence of relationships between them. Typically, this is in contrast to existing hierarchically-oriented browsers. For example, a reference relationship may exist between peers in a model, such as a method of a given class that refers to another method in that class. A directed graph may be formed by traversing the reference relationship to display these peer methods—where the directed graph indicates that the methods are related by this specific relationship, not that there is a subordinate relationship between them, as previously stated.

Further, relationships can be combined, to provide a composite view. When the user selects more than one relationship from a selected object, all the objects that are common to those relationships will be displayed. For example, the user may wish to view all the objects related to a specific object by both containment and inheritance. Or, he may wish to locate cyclic reference relationships, which can be accomplished by selecting both the "refers-to" and "is-referenced-by" relationships for a selected object.

In a preferred embodiment, the software embodying the present invention also provides the user with action choices, where the action choices comprise operations which are tailored to the existing relationship types. For example, when relationships of type "containment" exist for a selected object, action choices typically presented include such operations as "create new child", "move", "delete (with contained children)", "promote", "demote", and "show all children". Where the relationship is of type reference, such operations include "link to target", "unlink", and "reorder".

Further, the semantic typing of the relationships can be used to derive transaction boundaries for many common edit and manipulation operations that involve multiple objects and/or multiple relationships. For example, an operation such as "move" or "delete" for an object that has child objects related to it by containment relationships must move or delete all the related objects as an atomic transaction. Further, using the semantics of the relationship type enables this information to be explicitly presented to the user, so that he understands the underlying model and its complexities as he navigates and/or updates the model.

The preferred embodiment specifically comprises use of relationships of the general semantic types of containment, reference, inheritance, and dependency when creating the tailored list of available actions. When the relationship is of type "containment", this implies that all contained children (and their contained descendants) may be affected by an operation on the containing object. Accordingly, when operations such as move, delete, copy, promote, or demote are made available for such a containing object, the operations will be performed on the contained objects as well. These implications associated with the containment relationship will be indicated in the available actions list. The specific manner in which the indication is made does not form part of the present invention. For example, an actions choice such as "Move object and all descendants" may be presented. Further, for child objects that are contained, an operation will be provided to enable reordering those children within the containment relationship with the containing parent object. Elements that are the source of containment relationships (i.e. parent objects) may be given new children with an action such as "create new child". To prevent cycles in the underlying model, the preferred embodiment preferably checks for the possibility of direct as well as indirect cyclic containment relationships when the user moves a child to a new parent, and disallows the move operation if a cycle would result. The concepts of direct and indirect cycles are well known in the art, and will not be described in detail herein.

A relationship of type "reference" implies that one object refers to another object, and that a link therefore exists between the two objects. Operations made available in the actions list when the type is reference comprise choices such as "link" (i.e. create a reference), "unlink" (delete a reference), "refers-to", "is-referenced-by", etc. Reference relationships may optionally be cyclic.

A relationship of type "inheritance" includes the implications of the "reference" type, plus the further implication that the properties (for example, attributes or methods) of the referenced object are to be inherited by the referencing object. Operations presented in the actions list comprise choices such as "create inheriting element", "show inherits from", "show inherited-by", "show with inherited properties", "show without inherited properties", etc. Further, to avoid cycles in the model, the preferred embodiment preferably checks for direct or indirect inheritance cycles, and disallows creation of the inheritance relationship if a cycle would result.

A relationship of type "depend" implies that one object has a dependency on another object. For example, if one object defines variables that are used by a second object, the second object is said to depend on the first. Operations presented in the actions list comprise choices such as "show depends-from", "show depends-on", etc.

Further, instances of relationship types may themselves be shown as elements, and may have relationships to other elements. For example, a relationship such as "available relationship relationships" can be used to show all the available existing relationships for an element that connect to relationship types. Each of these relationships of the metamodel may also be shown in the browser, and used to explain the metamodel to the user, as well as to allow the user to extend the metamodel. For example, the user could see the types of element allowed to be source and destination of the relationship element, and any other information linked to the relationship type (for example, who defined this relationship type, or the name of a second relationship that returns the elements from which the user may select items to populate the relationship.

In the example shown in FIG. 4, if the user selected an "all relationships" relationship for the "Project" element, relationships 401, 402, 404, 422, and 424 would be displayed. If he then selected a "containment relationships" relationship, the only available containment relationship 401 would be displayed. If he selected a "linkable references relationships" relationship, both relationships 404 and 422 would be shown. The available relationships to show relationships can also be presented as a relationship. For example, if he selected a "relationship relationships" relationship, the "all relationships", "containment relationships", "linkable references relationships" relationships, as well as the "relationship relationships" relationship itself would be shown. These are examples of navigating the metamodel using the present invention, whereas the prior examples focused on navigating the model.

In a further refinement, relationship filters may be defined. A filter enables limiting a browser view to a useful predefined or user-defined subset of the available relationships. In any situation where there are many possible relationship types, it is useful to enable the user to select a subset for some particular purpose. Because the relationships on the metamodel define the available relationship types of the model, the metamodel relationships can be used to provide named lists representing subsets of the model's relationships. These named lists may be derived from the general semantic typing of the relationships, or they may be explicitly computed. For example, if the metamodel indicates that there are relationships of type "containment" from an object, the user could select to see only relationships pertaining to containment by creating a relationship filter for containment, thereby enabling him to view the model in a strictly hierarchical representation. A filter named, for example, "Reference relationships" might be used to provide only linked, peer-to-peer relationships. Other named relationship filters such as these examples can provide domain-specific named lists. This type of model can be reflectively closed on itself, to provide a self-descriptive system: a relationship filter such as "relationship relationships" would provide a list of the available relationships that return relationships.

Using semantic information from relationships according to the present invention enables existing, general-purpose browsers to be used for displaying and editing much more complex model information than is currently possible. Furthermore, since the information used to create the browser view is taken from the model, the browser can be used with entirely new element and relationship types, without modification of the browser itself.

Figure 3C:
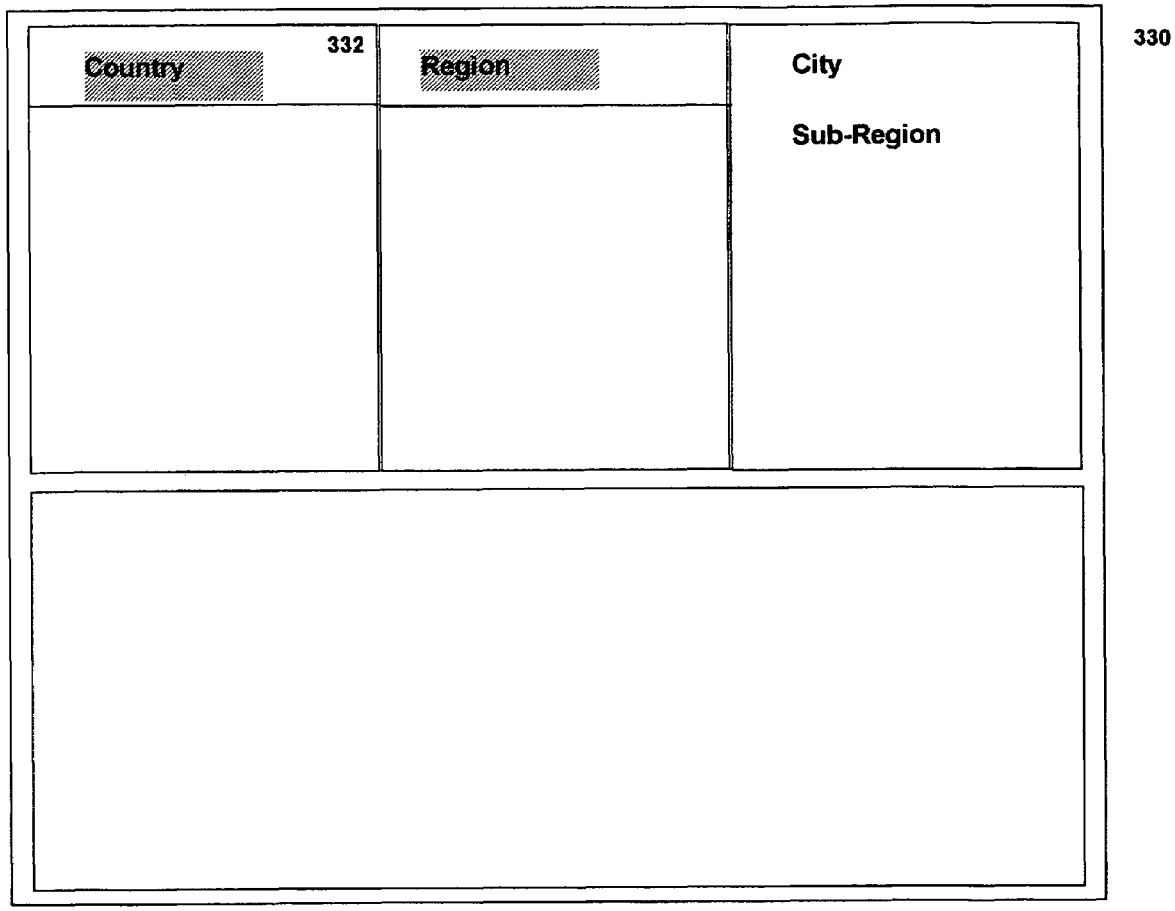

The limitations of the prior art will now be discussed with reference to FIGS. 3A–3C. FIG. 3A shows an example of a simple hierarchical object model that might be used to represent geographical information. In this example, a component type at the highest level of the hierarchy (the "root") is defined as "Country". In this object model, Country is the most broadly-defined component type, and thus it has no parent. FIG. 3B shows data elements that might be defined using the structure of this object model. In FIG. 3B, a specific Country "United States" has been defined. According to the structure in FIG. 3A, the next lower level of the hierarchy contains the single component type "Region", which may further be divided into "City" component types and/or "Sub-Region" (such as county) component types. In FIG. 3B, two instances of the Region component are depicted, "New York" and "Florida". Each of the Region instances is shown as having two instances at the next lower level. It will be obvious to one of ordinary skill in the art that the number of data elements, or instances, at a particular level is not limited to two: two instances have been shown in the example as a representative sample. Further, the number of levels is not limited to three.

FIG. 3C illustrates how this hierarchical object model might be depicted in a typical application browser. The leftmost pane of the upper region of the browser contains the component type Country. The next pane contains the component type Region, and the third pane contains the list of component types City and Sub-Region. Country and Region are shown as having been selected by the user (represented by the use of shading) for a more accurate illustration of the prior art, in which each successive pane is not filled with information until the user selects an element in a prior pane. (That is, if the model had other components at the same level as Region, the components to be displayed in the third pane would not necessarily be City and Sub-Region. Assuming that the user selected the Region component, then City and Sub-Region can be displayed in this third pane.) The navigation path selected by the user corresponds to traversing the hierarchical links 301, 303, 305 of the object model, from the top component 300 (the root) toward the bottom components 304, 306.

Figure 4A:
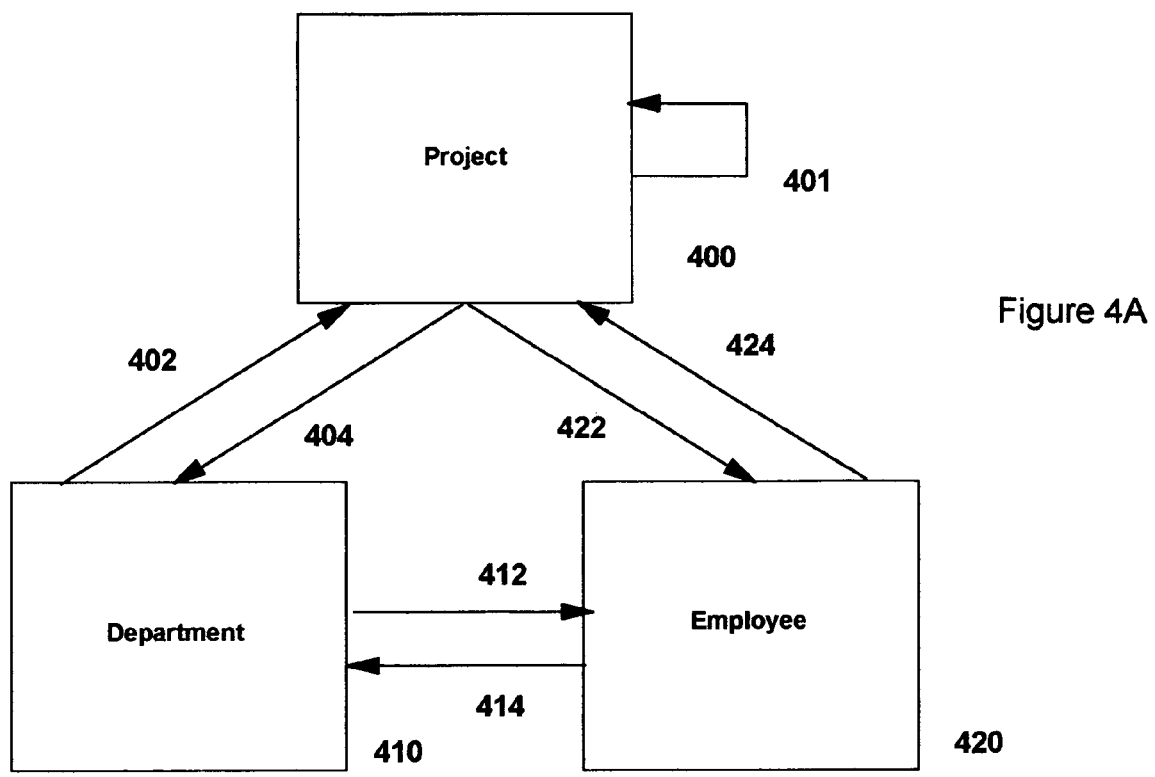

FIG. 4A shows an example of a complex relational object model that might be used to represent information in a typical business. Here, the model represents information about projects being worked on by employees who are members of departments. In this model, there is no topmost level or root. Instead, the three component types, "Project" 400, "Department" 410, and "Employee" 420 are peers. A number of relationships are defined among the component types. In this example, each component type has a relationship to each other component type, for a total of 6 relationships 402, 404, 412, 414, 422, and 424. Further, the Project component type is shown as having a relationship 401 to itself. The relationship 412 between Department and Employee may be conceptually defined as "has-Employees", while the relationship 414 between Employee and Department may be defined as "is-in-Department". Relationship 412 is typically a one-to-many relationship in the real world—that is, one Department normally has many Employees. Relation 414 may be a one-to-one relationship, whereby one employee is in only one department, or it may be a one-to-many relationship in some organizations. Suppose for purposes of illustration that the relationship is many-to-many. Similar relationship descriptions may be constructed for the relationships 402 (e.g. "Dept-works-on-Projects"), 404 ("worked-on-by-Depts"), 422 ("worked-on-by-Employees"), and 424 ("Empl-works-on-Projects").

The relationship 401 from Project to Project is a recursive relationship, and indicates that Projects may contain other Projects (which may be described as sub-projects). This containment relationship, in practice, may continue for an arbitrary number of levels of nesting. The present invention enables the user to navigate intuitively through these levels, by explicitly showing the containment relationship between Project components.

FIGS. 4B–4D show tables containing data elements that might be defined using the structure of this object model. As is known in the art, tables are used to describe a relational model, in which columns of a table correspond to attributes of the particular component type, and rows of the table correspond to an instance of the values for those attributes. In FIG. 4B, several instances of the Project component are shown as rows in the Project table. The Sub-Project column indicates the recursive containment relationship 401 between projects, where two of the four projects (AD3100 and OP2000) have sub-projects (MA2100 and OP2010, respectively). Similarly, FIG. 4C shows instances of the Department component and FIG. 4D shows instances of the Employee component. Each of these component types may have an arbitrary number of attributes. A small number of attributes has been chosen for illustrative purposes. The relationships 402, 404, 412, 414, 422, 424 are not explicitly shown in these example tables. Typically, these relationships would be stored in the tables as pointers to rows of other tables, as is known in the art.

Suppose that this relational model was to be displayed using the hierarchical browser depicted in FIG. 3C. The leftmost pane would display the component types Department, Employee, and Project—presumably in alphabetical order. Further suppose the user selects the Department component from this pane. As shown in FIG. 4A, a Department component 410 can be further defined in terms of (1) the employees who work in that Department (and are defined according to the Employee component 420), according to relationship 412, and also in terms of (2) the projects worked on by that Department (which are defined according to Project component 400), according to relationship 402. However, to display these two components in the next pane is to force the component relationships into a hierarchical model, whereby the other relationships 404, 414 in which Department plays a role are ignored. This presents the user with an inaccurate view of the underlying object model. When the user is a developer who may be making changes to the attributes of a component, or creating new instances for a component, this inaccurate view of the model may lead to malfunctioning applications, incomplete data, or any number of other problems.

Figure 4E:
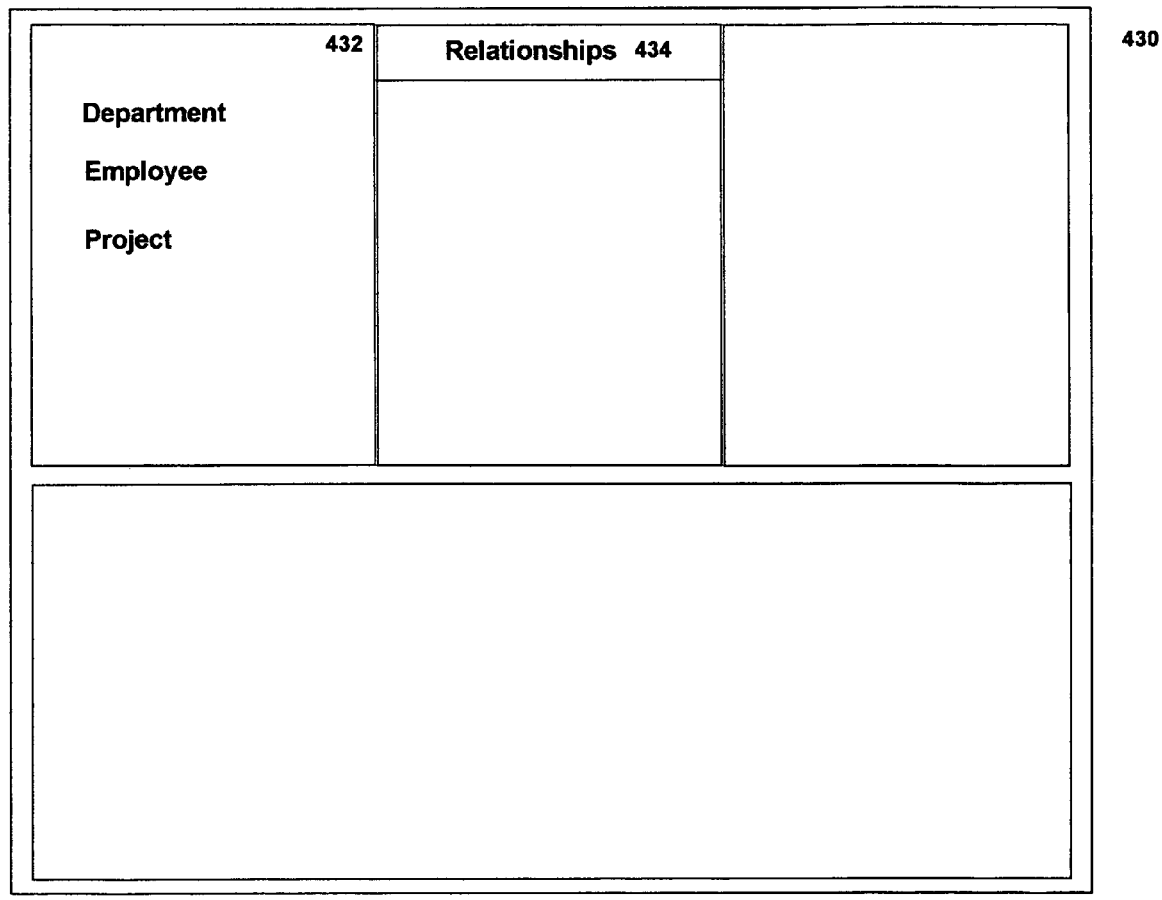
Figure 4F:
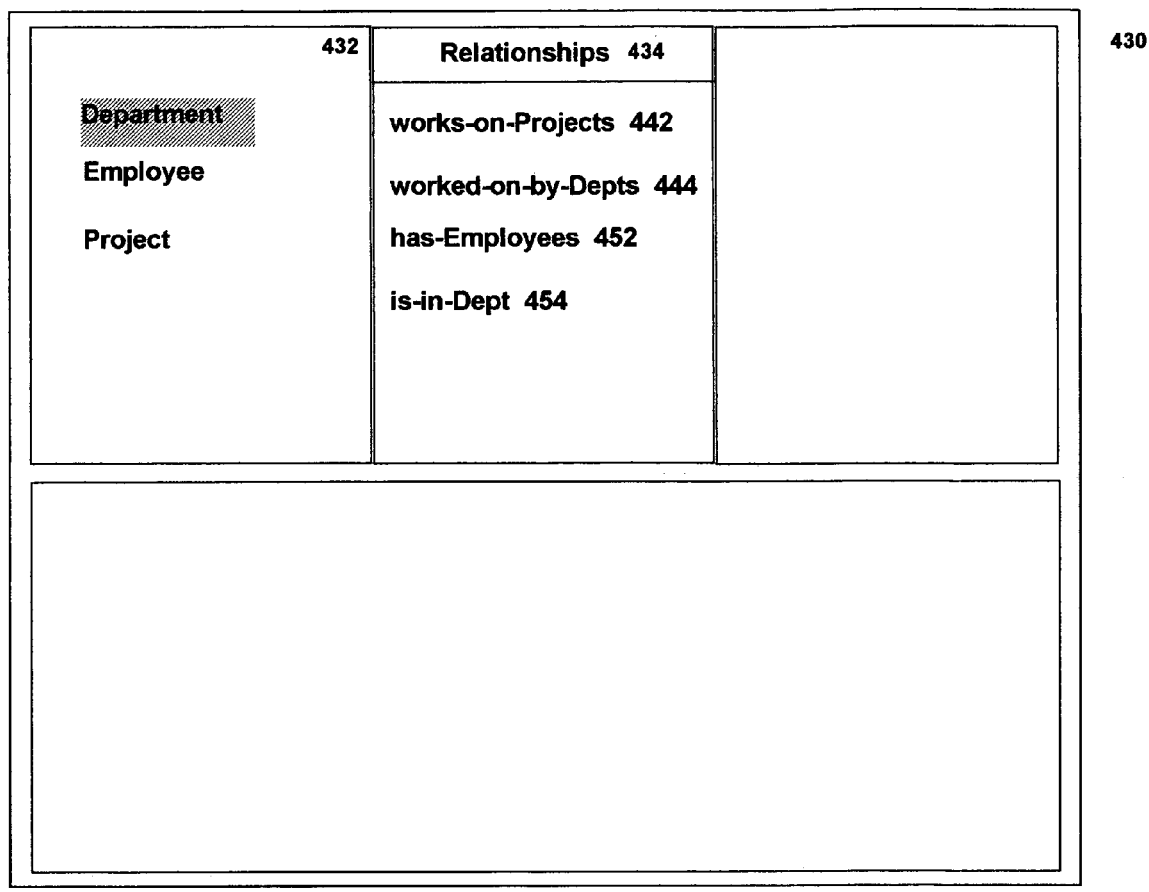

The browser depicted in FIGS. 4E–4F shows the present invention in operation, and illustrates how the shortcomings of the prior art are overcome. In FIG. 4E, the three component types are displayed in the leftmost pane of the browser, as in FIG. 3C. Note that the heading of the subsequent pane indicates to the user that relationship information will be displayed in this pane. (Use of this heading text is an optional feature of a preferred embodiment.) In FIG. 4F, the user has selected the Department component. Now, instead of the prior art approach of displaying the other 2 components with which Department has relationships, the present invention displays descriptors of the 4 relationships 402, 404, 412, 414 in which Department components are involved. Thus, none of the semantic information from the underlying model is hidden from the user.

Figure 5A:
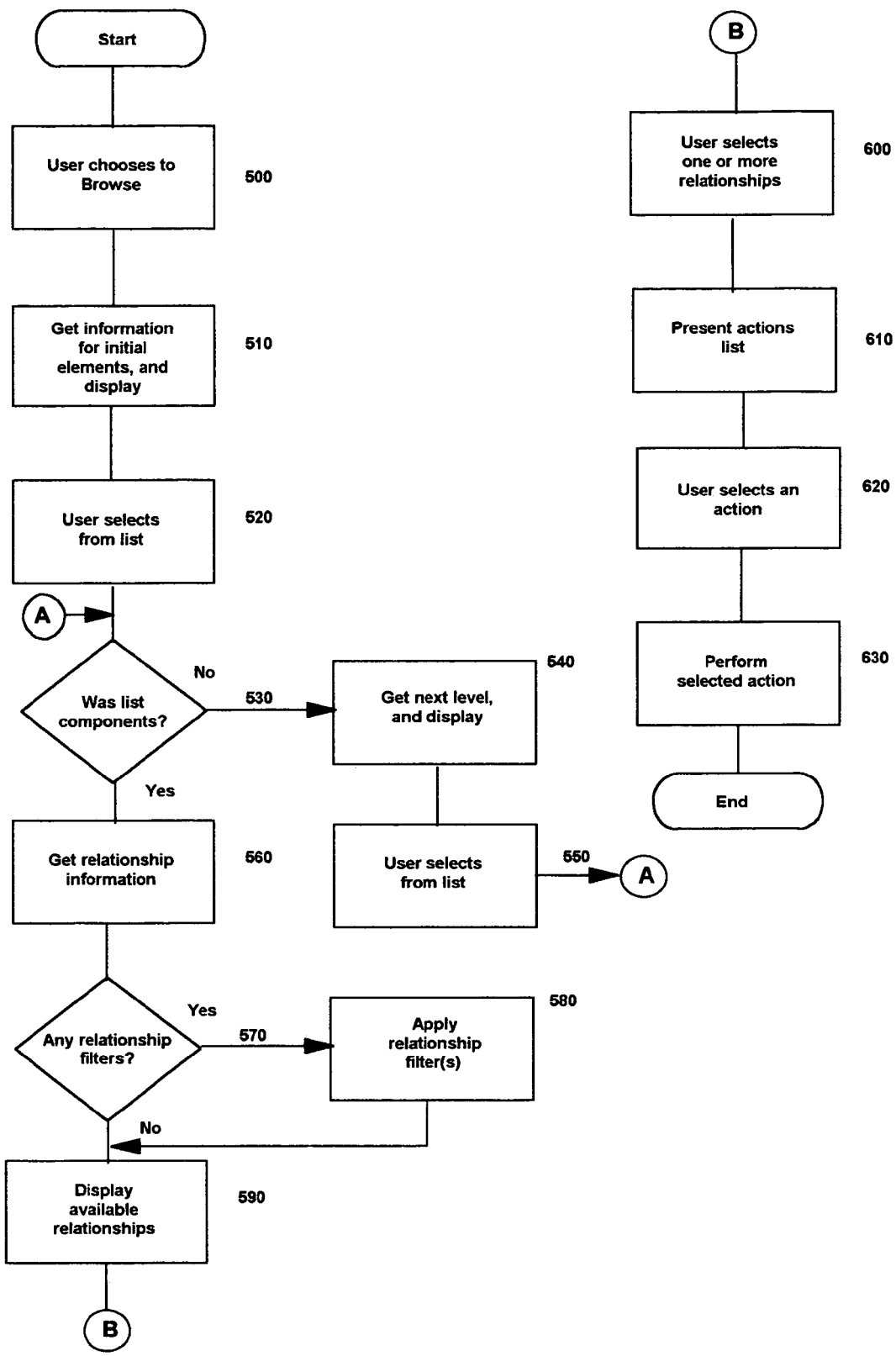
FIGS. 5A–5B illustrate flow charts which set forth the logic involved in using the present invention to display and navigate a model having complex relationships.

FIG. 5A illustrates the logical steps followed when operating a software application that integrates the present invention with a conventional browser, or that has a browser specifically written to take advantage of the present invention. The implementation of a browser (other than the techniques adapted for the present invention)—that is, facilities such as displaying lists of elements in windows, and responding to user selection from those lists—does not form part of the present invention, and will not be discussed herein.

The process begins at Step 500, where the user indicates that he wants to browse an object model. Browsing would be a choice presented by a typical interactive development environment, and the user would select the choice by clicking with a mouse or by another selection means. (The present invention is not limited to use in an IDE, as previously discussed, but may be used in any environment in which models can be browsed.) At Step 510, the implementation gets information about the initial elements to start from, and displays those elements, e.g. in the left-most pane of the browser. The user selects an element from this displayed list at Step 520. Techniques for obtaining information about an object model, displaying that information, allowing a user selection, and responding to that selection are all well known in the art.

At Step 530, a test is made to determine whether the displayed list was a list of components. (For example, the pane may have contained a list of component categories. If this was the case, then there are no relationships to be displayed, and thus the advantages of the present invention will not yet be presented to the user.) If it was, then control transfers to Step 560; otherwise, processing continues at Step 540.

At Step 540, information about the next level of the object model is retrieved and displayed, e.g. in a next pane. The user is allowed to select from this list at Step 550, and control returns to Step 530.

Control reaches Step 560 when the user has selected a component of the object model. Relationships will exist for this level of the model, so the advantages of the present invention will now become apparent to the user. Step 560 retrieves the relationships that are defined for the component selected at Step 520 (or Step 550).

At Step 570, a test is made to determine whether any relationship filters are applicable in the context of the current browser. If the answer is "Yes", control transfers to Step 580, where the filter(s) is/are applied. Otherwise, none of the relationships are to be filtered from the display, and control transfers to Step 590. The available set of filters is a property of the element type, and the choice of the default filter to be shown depends on the browser. A filter may be modelled as a relationship which returns a list of relationships. The relationship filters for a given component are defined according to the process of FIG. 5B. The user may select a relationship filter at Step 570 by causing a list of the available filters to be displayed, such as by invoking a pop-up or pull-down menu in which the choices will be displayed.

The processing of Step 580 limits the relationships that will be displayed to the user. For example, if a relationship filter specifies that only containment relationships are to be displayed, then a subset of the list of available relationships that was retrieved at Step 560 will created, where that subset comprises the relationships related to containment—such as "contains" and "is-contained-in". The relationship filter may specify more complex criteria than limiting display to a single relationship type. The criteria will be represented as a Boolean expression. This enables filters to be created that will display, for example, all relationships except "reference" (by defining a filter with the semantics "NOT reference type") or both inheritance and dependency relationships (by defining a filter with the semantics "inheritance type AND dependency type"). The manner in which relationship filters are created is further described below, with reference to FIG. 5B. The manner in which a Boolean expression, including a relationship filter specifying a Boolean expression, is applied to limit a subset of a group is well known in the art.

Step 590 displays those relationships which are available. The information displayed will be a previously-defined descriptive text phrase, enabling the user to understand the role played by the selected component in the object model. (The manner of defining the descriptive phrase does not form part of the present invention.) By understanding the component and its relationships, the user is able to make better-informed decisions about how to modify the component's attributes, create new relationships, create new instances of data according to the model's definitions, etc.

At Step 600, the user selects one of the displayed relationship descriptors. For example, if the user selected a Department at Step 520, he may next select the "has-Employees" relationship at Step 600 by clicking on its descriptor. Alternatively, the user may select more than one relationship at Step 600, by clicking on more than one of the displayed relationships.

At Step 610, an actions list is displayed. In a preferred embodiment, this actions list comprises actions that are tailored to the selection made at Step 600. Actions on a specific relationship can be presented to the user with generic labels, since the user will already know which relationship this action applies to. For example, in the scenario just described where the user selected the "has-Employees" relationship, the action list may contain choices such as "create", "show all", etc. It will be apparent to the user that the "create" action will create a new Employee in this Department, and that the "show all" action will show all the Employees of the Department. Several actions are possible for navigating a relationship. For example, "Follow", which will just cause the destinations of the relationship to be shown in the pane (the same as clicking); "Browse", which will open a new browser with the destinations of the link in the left hand pane; or "Browse connections", which will open a new browser on model elements representing individual link instances of the relationship.

It is also possible to use the relationships available for an object, to automatically derive a list of actions available for that object (instead of actions available for a relationship). In this case, the actions list would be made available upon selection of an object, for example by enabling the user to select a pop-up menu following the "Yes" branch of Step 530. In this case, labels may be used that contain both an action name and a relationship name. For example, after selecting a Department, actions labelled "create Employee" or "create Project" may be displayed as action choices. Additionally, the actions list may be organized hierarchically for presentation to the user. For example, "create", "link", and "show" might be choices from a first level of a pop-up menu, where "Employee" and "Project" would be choices on the next level for all three of the higher-level actions.

Once the user selects an action choice at Step 620, Step 630 implements that action choice. Techniques for performing the action choices are well known in the art, and do not form part of the present invention.

The processing flow of FIG. 5A may be re-entered at a number of points following completion of Step 630, depending on the user's preferences. He may choose to select a different highest-level choice at Step 520, a different lower-level choice at Step 550, a different relationship at Step 600, or a different action choice at Step 620. Processing will continue from that point according to the descriptions above.

Figure 5B:
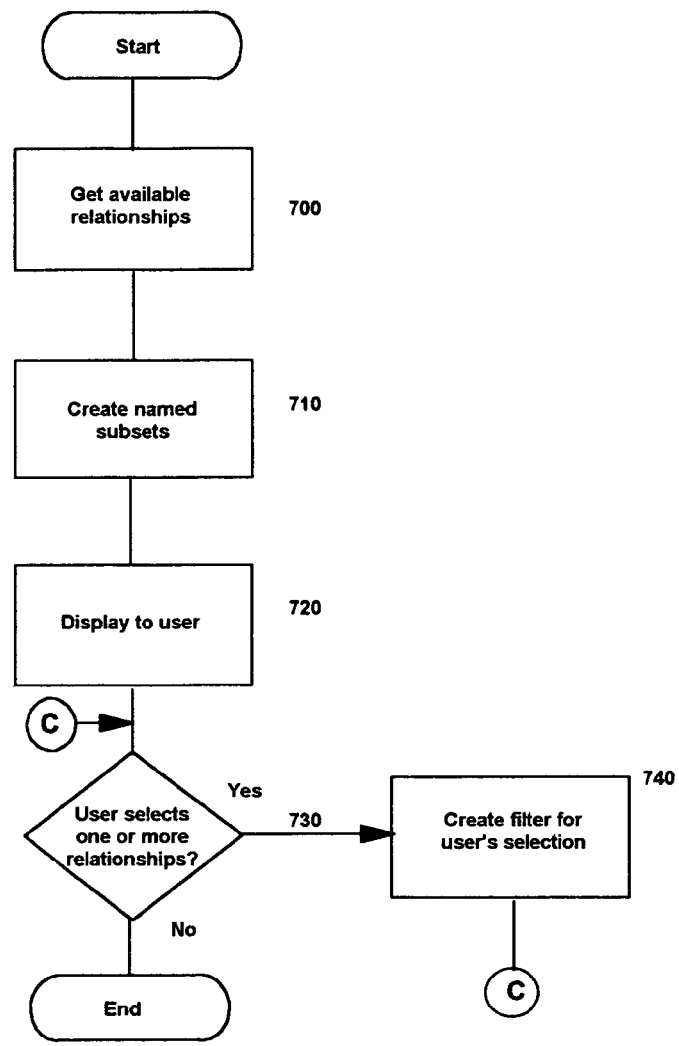

FIG. 5B shows the logic involved with creating a relationship filter. Defining filters used with the present invention may occur at any point during interaction with the implementation, while using the browse feature or while using some other feature. Step 700 indicates that the available relationships are obtained. If the user is currently browsing an object model, and has selected an object, then the relationships defined for that object are obtained. If, however, the user has not selected an object, then the process of FIG. 5B operates in a generic manner based on relationship types that are typically available (such as inheritance, containment, dependency, and reference), so those relationship types are obtained. In this latter scenario, the relationship types may be simply predefined in the software that implements Step 700.

At Step 710, named subsets are created from the relationships obtained in Step 700. These named subsets use the semantic typing of the relationships. For example, when relationships such as "refers-to" and "is-referenced-by" are available, a named subset such as "references" or "reference relationships" can be created by detecting the "refer" portion of the relationship descriptors. Using the relationship descriptors 402, 404, 422, and 424 described previously for FIG. 4, named subsets such as "works-on" and "worked-on" could be created by detecting those strings of characters.

The named subsets are presented to the user at Step 720. He may then select one or more of these subsets at Step 730 to create a relationship filter. When one or more subsets have been selected, the corresponding filter is created at Step 740. For example, the user may invoke a pop-up or pull-down menu from which Boolean operators are available. He may select an operator from those choices, and apply the operator to one of the selected relationships to form complex Boolean expressions such as those previously discussed. In order to use the relationship filters during the process of FIG. 5A, to limit the display of available relationships, an identifier of some type will be associated with each filter that is created. When the process of creating the filter is complete, it will be stored (e.g. on disk). The filter name can then be selected by the user (e.g. at Step 570 of FIG. 5A), to apply the filtering operation specified by its corresponding Boolean expression.

It will be obvious to one of ordinary skill in the art that the processes of Steps 730 and 740 may be intermingled, without deviating from the inventive concepts of the present invention. For example, the user may select a relationship, then choose a Boolean operator to associate with that relationship (such as NOT), then select another relationship and another Boolean operator, where that Boolean may be associated with either the second relationship or the combination of both selected relationships (e.g. AND or OR), etc.

Following completion of Step 740, the user is allowed to create additional relationship filters by transferring control back to Step 730. When no more filters are to be created, the process of FIG. 5B ends by following the "No" branch of Step 730.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. A method for implementing a convenient and intuitive visually-oriented technique for navigating an object model in a computing environment comprising the steps of:
   displaying a browser;
   retrieving and displaying a set of elements in said browser, said elements representing said object model;
   enabling a user of said code to select one of said elements; and retrieving and displaying relationship information from said model when said selected element is a component of said model; and, enabling said user to select one or more relationships from said relationship information; and, presenting an action list to said user following said selection of relationship information.

2. The method for implementing the technique according to claim 1, wherein said action list comprises a list of actions tailored to said selected relationship information.

3. The method for implementing the technique according to claim 1, wherein said action list comprises a list of action tailored to said selected element when said element is a component.

4. The method for implementing the technique according to claim 1, further comprising the step of filtering said action list before presenting said action list to said user, using one or more predefined filters.

5. In a computing environment, computer readable code for implementing a convenient and intuitive visually-oriented technique for navigating an object model, said computer readable code comprising:

a subprocess for displaying a browser;

a subprocess for retrieving and displaying a set of elements in said browser, said elements representing said object model;

a subprocess for enabling a user of said code to select one of said elements;

a subprocess for retrieving and displaying relationship information from said model when said selected element is a component of said model;

a subprocess for enabling said user to select one or more relationships from said relationship information; and, a subprocess for presenting an action list to said user.

6. Computer readable code for implementing the technique according to claim 5, wherein said action list comprises a list of actions tailored to said selected one or more relationships.

7. Computer readable code for implementing the technique according to claim 5, wherein said action list comprises a list of actions tailored to said selected element when said element is a component.

8. Computer readable code for implementing the technique according to claim 5, wherein said action list is filtered before being presented to said user, using one or more predefined filters.

9. Computer readable code for implementing the technique according to claim 5, wherein said browser is a conventional browser.

10. A system for implementing a convenient and intuitive visually-oriented technique for navigating an object model in, a computing environment, comprising:

means for displaying a browser;

means for retrieving and displaying a set of elements in said browser, said elements representing said object model;

means for enabling, a user of said code to select one of said elements;

means for retrieving and displaying relationship information from said model when said selected element is a component of said model;

means for enabling said user to select one or more relationships from said relationship information: and, means for presenting an action list to said user.

11. The system for implementing the technique according to claim 10, wherein said action list comprises a list of actions tailored to said selected one or more relationships.

12. The system for implementing the technique according to claim 10, wherein said action list comprises a list of actions tailored to said selected element when said element is a component.

13. The system for implementing the technique according to claim 10, wherein said action list is filtered before being presented to said user, using one or more predefined filters.

14. The system for implementing the technique according to claim 10, wherein said browser is a conventional browser.

\* \* \* \* \*